United States Patent [19]

Sabelström et al.

[11] Patent Number: 5,315,974
[45] Date of Patent: May 31, 1994

[54] INTERNAL COMBUSTION ENGINE WITH COMPRESSOR FUNCTION

[75] Inventors: Mats Sabelström, Billdal; Lars Tenglund, Henan, both of Sweden

[73] Assignee: AB Volvo, Goteborg, Sweden

[21] Appl. No.: 64,135

[22] PCT Filed: Nov. 23, 1990

[86] PCT No.: PCT/SE91/00791

§ 371 Date: May 24, 1993

§ 102(e) Date: Sep. 20, 1993

[87] PCT Pub. No.: WO92/09792

PCT Pub. Date: Jun. 11, 1992

[30] Foreign Application Priority Data

Nov. 23, 1990 [SE] Sweden ................... 9003735

[51] Int. Cl.$^5$ .............................................. F02D 39/02
[52] U.S. Cl. ................................ 123/320; 123/321; 123/294
[58] Field of Search ............... 123/294, 320, 321, 322, 123/323, 196 R; 188/271, 272; 60/628, 627, 629, 712

[56] References Cited

U.S. PATENT DOCUMENTS

| | | | |
|---|---|---|---|
| 2,005,536 | 6/1935 | Dickson | 123/320 |
| 4,557,232 | 12/1985 | De Lorean | 123/320 |
| 4,658,781 | 4/1987 | Guinea | 123/320 |
| 4,706,624 | 11/1987 | Meistrick et al. | 123/321 |
| 4,930,471 | 6/1990 | Korner et al. | 123/196 R |
| 5,078,238 | 1/1992 | Okada | 188/271 |
| 5,195,489 | 3/1993 | Reich | 123/321 |

Primary Examiner—Raymond A. Nelli
Attorney, Agent, or Firm—Young & Thompson

[57] ABSTRACT

The present invention relates to an internal combustion engine with compressor function comprising, in addition to intake and exhaust valves for each cylinder, an extra exhaust valve in at least one cylinder, which extra exhaust valve, in its open position, puts the cylinder chamber in communication with valve means containing an exhaust duct and disposed to permit exhausting of intake air to a pneumatic system but prevent intake of air to the cylinder chamber via said exhaust duct.

3 Claims, 1 Drawing Sheet

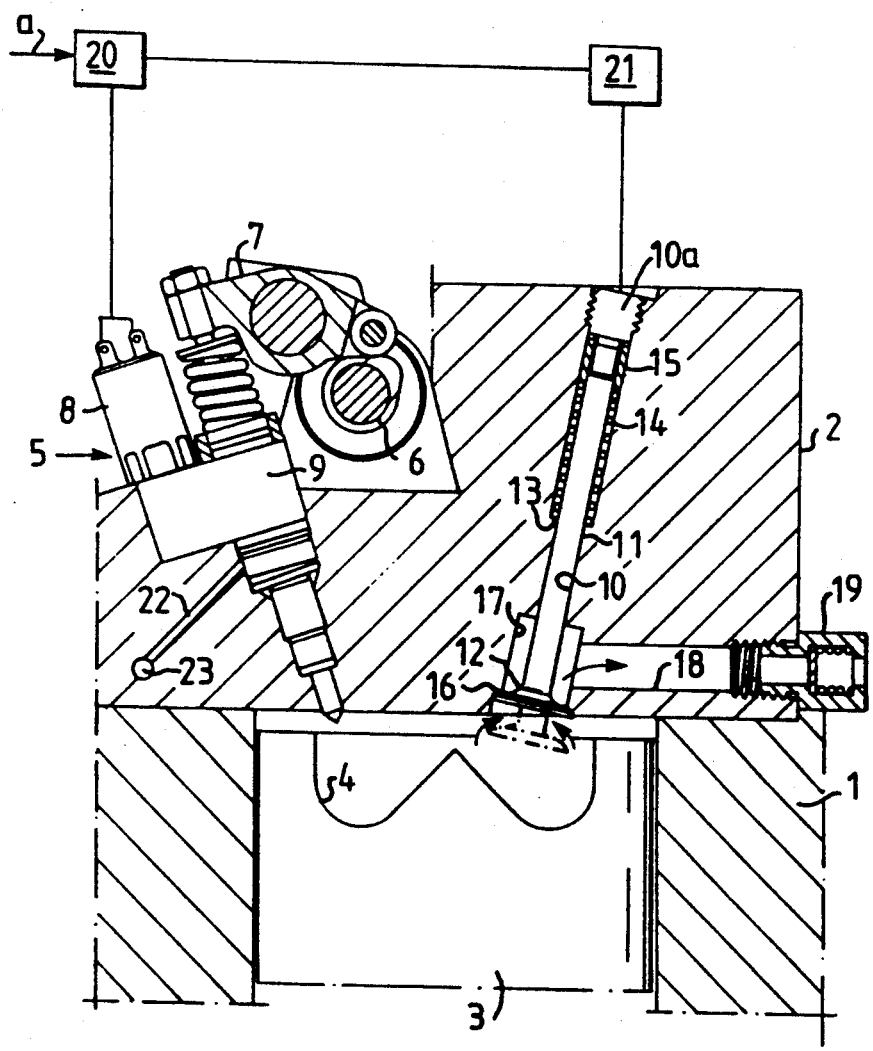

INTERNAL COMBUSTION ENGINE WITH COMPRESSOR FUNCTION

The present invention relates to an internal combustion engine with compressor function comprising, in addition to intake and exhaust valves for each cylinder, an extra exhaust valve in at least one cylinder, which extra exhaust valve, in its open position, puts the cylinder chamber in communication with valve means containing an exhaust duct and disposed to permit exhausting of intake air to a pneumatic system but prevent intake of air to the cylinder chamber via said exhaust duct.

It is previously known to use one or more cylinders in a diesel engine as compressor cylinders by providing the cylinders with an extra exhaust valve and equipping the injection system of the engine with devices through which the supply of fuel to the cylinder serving as compressor cylinders can be interrupted. Such a compressor arrangement can, inter alia, be designed to supplement the ordinary air compressor, which normally supplies the vehicle pneumatic system, when the capacity of this normal compressor for some reason is not sufficient, or alternatively it can be designed as the sole compressed air source for the vehicle.

A diesel engine with compressor function of the above-mentioned type is shown and described in U.S. Pat. No. 2,005,536. The engine is provided with a mechanical injection system having a conventional multiple cylinder injection pump. Via a system of cam shafts with cams controlling shunt valves, the fuel supply to the compressor cylinder in question is interrupted at the same time as the extra exhaust valve is opened under the influence of additional cams on the cam shafts. This known installation is complicated in its mechanical design and increases, inter alia due to the presence of the shunt valves on the high pressure side of the injection system, the susceptibility of the injection system to disruption.

The purpose of the present invention is to achieve an internal combustion engine of the type described by way of introduction in which the supply of fuel to a cylinder serving as a compressor cylinder can be interrupted without the need to supplement the engine injection system with complicated specially designed equipment.

This is achieved according to the invention by virtue of the fact that the engine has a fuel injection system with a unit injector with an electrically operated spill valve for each cylinder and that means are arranged which can keep the spill valve of the cylinder provided with the extra exhaust valve open at the same time as the extra exhaust valve is open.

In injection systems with electric unit injectors, an electronic control unit is coupled to a solenoid valve in each injector. This valve determines, in response to signals from the control unit, when the injection to each cylinder is to be initiated and terminated. When the valve closes, the pump piston integrated in the unit injector builds up a pressure and the injection is initiated when this pressure exceeds the opening pressure of the injection nozzle. When the injection is to be terminated, the solenoid valve is opened and the pressure drops below the opening pressure of the injection nozzle. The supply of fuel to a particular cylinder can thus be entirely cut off simply by a control unit signal to open the spill valve of the associated unit injector, when the cylinder is to function as a compressor cylinder.

BRIEF DESCRIPTION OF DRAWINGS

The drawing represents a portion of the cylinder block and cylinder head embodying the current invention.

The invention is described in more detail with reference to an example shown in the accompanying drawing, where the Figure shows a crone-section through a schematically represented cylinder with associated portion of the cylinder head in the diesel engine.

In the Figure, 1 designates a portion of a cylinder block and 2 designates a portion of a cylinder head. Details such as intake and exhaust ducts with associated valves and other details which are not directly pertinent to the invention have been left out for the sake of clarity. The engine is a direct injection diesel and has a piston 3 with a depression 4 forming a combustion chamber. It has a fuel injection system with so-called unit injectors 5, i.e. injectors each provided with an individually integrated piston driven by a cam shaft 6 via a rocker arm 7 and a spill valve (only indicated here) operated by an electrical magnet 8 for controlling the period of injection.

The cylinder shown in the Figure has a bore 10 in its cylinder head 2, in which a spindel 11 to a valve disc 12 is displaceably mounted. The bore 10 has a shoulder 13. A helical spring 14 is tensioned between the shoulder 13 and a sleeve 15 fixed at the end of the spindel 11 and biases the valve disc 12 towards a valve seat 16 at the edge of a widened portion 17 of the bore 10. From the widened portion 17 of the bore, a duct 18 extends out through the cylinder head. When the valve disc 12 has been lifted from its seat (dash and dot lines), the piston 3 during its compression stroke can press air out of the cylinder chamber to a compressed air system via the channel 18. A non-return valve 19 prevents air from being sucked in via the duct 18 when the piston begans its intake stroke.

20 in the Figure designates the electronic control unit of the fuel injection system, into which, in a known manner, signals are fed representing throttle opening, engine temperature etc. for controlling the injection. The control unit cooperates in accordance with the invention with the portion 10a of the bore 10 above the valve spindel. When a command, represented by the arrow "a" in the Figure, is given to the control unit 20 that the cylinder is to work as a compressor, the bore 10a above the spindel 11 is put under pressure at the same time as current to the electromagnet 8 is cut off. Thus, the valve disc 12 is displaced to its open position at the same time as the spill valve 9 of the injector 5 is moved to its open position, thus returning the fuel to a return line 23 via a channel 22. The command to the control unit can be given manually via a manual switch (not shown) or automatically, for example via a pressure sensor in a pneumatic system coupled to the cylinder duct 18. In a multiple cylinder engine, one or more cylinders can be made in the manner described above. The use of an electronically controlled unit injector system makes it possible in a simple manner to engage the compressor function and to determine how many cylinders are to work as compressor at each occasion.

We claim:

1. Internal combustion engine with compressor function, comprising, in addition to intake and exhaust valves for each cylinder, an extra exhaust valve in at least one cylinder, which extra exhaust valve in its open position puts the cylinder chamber in communication with valve means containing an exhaust duct and disposed to permit exhausting of intake air to a pneumatic system but prevent intake of air to the cylinder chamber via said exhaust duct, characterized in that the engine has a fuel injection system with a unit injector (5) with an electrically operated spill valve (9) for each cylinder and that means (8, 20) are arranged which can keep the spill valve of the cylinder provided with the extra exhaust valve (11, 12) open at the same time as the extra exhaust valve is open.

2. Internal combustion engine according to claim 1, characterized in that the extra exhaust valve has a valve disc with a spindle (11), which cooperates with spring elements (14), biasing the valve towards a closed position, and that means (21) are arranged to keep the valve constantly open when the piston (3) in the associated cylinder is to work as a compressor piston.

3. Internal combustion engine according to claim 2, characterized in that the spindle (11) is mounted in a bore (10) with a portion formed as a cylinder (10a) and has a portion (15) functioning as a piston, that the cylinder (10a) has an intake for a pressure medium and that the piston portion (15) when pressure medium is supplied to the cylinder loads the valve (12) towards its open position.

* * * * *